US007134672B2

(12) United States Patent
Beishline et al.

(10) Patent No.: US 7,134,672 B2
(45) Date of Patent: Nov. 14, 2006

(54) FAILSAFE ACTUATOR

(75) Inventors: Eric Beishline, Marlborough, MA (US);
William H. Fort, Stratham, NH (US);
Henry Minasian, Weymouth, MA (US);
Brian Ganter, Foxborough, MA (US);
Yuly Yanishevsky, Marblehead, MA (US); Michael Johnson, Whitman, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 206 days.

(21) Appl. No.: 10/625,828

(22) Filed: Jul. 23, 2003

(65) Prior Publication Data
US 2004/0140630 A1 Jul. 22, 2004

Related U.S. Application Data

(63) Continuation-in-part of application No. 10/267,090, filed on Jul. 19, 2002, now Pat. No. 6,942,227.

(60) Provisional application No. 60/306,628, filed on Jul. 19, 2001, provisional application No. 60/398,309, filed on Jul. 24, 2002.

(51) Int. Cl.
*B60G 17/005* (2006.01)
(52) U.S. Cl. .................................. 280/5.502
(58) Field of Classification Search ............ 280/5.501, 280/5.502, 5.506, 5.507, 5.508, 5.509, 124.106, 280/124.107, 124.137, 124.149
See application file for complete search history.

(56) References Cited

U.S. PATENT DOCUMENTS

| 4,423,364 A | * | 12/1983 | Kompelien et al. | ......... | 318/440 |
|---|---|---|---|---|---|
| 5,032,995 A | * | 7/1991 | Matsuda et al. | ............... | 701/34 |
| 5,182,498 A | * | 1/1993 | Stuhr | ........................ | 318/15 |
| 5,505,480 A | | 4/1996 | Pascarella | .................... | 280/689 |
| 5,744,876 A | * | 4/1998 | Fangio | ........................ | 307/66 |
| 5,988,319 A | * | 11/1999 | Hudson et al. | ........... | 185/40 R |
| 6,179,310 B1 | | 1/2001 | Clare et al. | ........... | 280/124.159 |
| 6,295,490 B1 | | 9/2001 | Streib | ........................ | 701/29 |
| 6,428,019 B1 | | 8/2002 | Kincad et al. | ................. | 280/5 |
| 6,467,748 B1 | * | 10/2002 | Schick et al. | ............... | 248/550 |
| 6,622,984 B1 | * | 9/2003 | Rauch et al. | ................. | 251/71 |
| 6,637,757 B1 | | 10/2003 | Ignatius et al. | ................ | 280/5 |

OTHER PUBLICATIONS

International Search Report Mailed Jun. 30, 2004 in connection with PCT Appln. Serial No. PCT/US03/22937.
International Preliminary Examination Report dated Feb. 1, 2005.

\* cited by examiner

*Primary Examiner*—David R. Dunn
(74) *Attorney, Agent, or Firm*—Grossman, Tucker, Perreault & Pfleger, PLLC

(57) ABSTRACT

A failsafe actuator is provided for returning an actuator driven element to a failsafe position in case of a failure condition. The actuator includes a drive assembly for driving a plunger from a first plunger position to a second plunger position. The actuator additionally includes a stored energy element for driving the plunger from the second plunger position to the first plunger position on the occurrence of the failure condition, wherein the actuator driven element is responsive to the plunger such that the actuator drive element is driven to the failsafe position when the plunger is driven to the first position.

23 Claims, 6 Drawing Sheets

FAILSAFE ACTUATOR

CROSS-REFERENCE TO RELATED APPLICATIONS

This application is a continuation-in-part of U.S. application Ser. No. 10/267,090, filed Jul. 19, 2002 now U.S. Pat. No. 6,942,227 which claims the benefit of U.S. provisional application Ser. No. 60/306,628, filed Jul. 19, 2001. This application also claims the benefit of U.S. provisional application Ser. No. 60/398,309, filed Jul. 24, 2002. The entire disclosures of all named applications are herein incorporated by reference in their entirety.

FIELD OF THE INVENTION

The present invention relates generally to an actuator with a failsafe mechanism for permitting an actuator to move an actuator driven element, and in particular a vehicle stabilizer bar, to a safer default position in case of a failure condition such as an external or internal electrical failure.

BACKGROUND OF THE INVENTION

Vehicles, especially four wheel drive and off-road vehicles, may be equipped with a vehicle suspension system which includes a stabilizer bar or stabilizer bars (one for the front and one for the rear). Generally, a stabilizer bar includes a torsion bar that links two wheels together so they act in unison at high speed. For example, the stabilizer bar enhances drivability on smooth road surfaces by resisting instability as a vehicle changes lanes. On the other hand, the same high rigidity imparted by the stabilizer bar may degrade traction and independent wheel articulation on rough off-road surfaces. In addition, the high rigidity of the stabilizer bar may cause the traction of the left side and right side wheels to differ significantly causing differential transmission of driving torque which may further degrade road handling characteristics on rough road surfaces. Therefore, a stabilizer bar disconnect system driven by an actuator may be used to deactivate the stabilizer bar when driving on rough road conditions.

However, if failures such as external actuator electrical or internal actuator electrical failures occur, the actuator may become stuck in an "off-road" position with the stabilizer bar deactivated. This "off-road" position is undesirable for most smooth road driving conditions. Hence, reduced drivability could lead to a greater likelihood of accidents such as rollovers on smooth road conditions until the failure problem is repaired.

Accordingly, there is a need for an actuator with a failsafe mechanism for controlling an actuator driven element, particularly a stabilizer bar mechanism in a vehicle, which permits return of the actuator driven element to a more safe default position in case of a failure condition such as an external or internal electrical failure.

SUMMARY OF THE INVENTION

According to a first aspect, a failsafe actuator is provided for returning an actuator driven element to a failsafe position in case of a failure condition. The actuator includes a drive assembly configured to drive the actuator driven element, in which the drive assembly includes a plunger having at least a first plunger position, and the actuator driven element is responsive to the plunger such that the actuator driven element is in the failsafe position when the plunger is in the first plunger position. The actuator further includes a stored energy element configured to drive the plunger to the first plunger position, and hence the actuator driven element to the failsafe position, upon detection of a failure condition.

According to another aspect, a failsafe actuator is provided for returning an actuator driven element to a failsafe position in case of a failure condition. The failsafe actuator includes a drive assembly configured to drive a plunger from a first plunger position to a second plunger position, and a stored energy element configured to drive the plunger from the second plunger position to the first plunger position upon the failure condition. The actuator driven element is responsive to the plunger such that the actuator driven element is in the failsafe position when the plunger is in said the plunger position.

According to another a method is provided for returning an element to a failsafe position in case of a failure condition. The method includes driving a plunger from a first plunger position to a second plunger position, thereby preloading a stored energy element, holding the plunger in at least the second plunger position, detecting the failure condition, releasing the plunger from the at least second plunger position upon detection of the failure condition, and driving the plunger from the at least second plunger position to the first plunger position, wherein the element is responsive to a position of the plunger such that the element is in the failsafe position when the plunger is in the first plunger position.

According to another aspect, a method is provided for returning a driven element to a failsafe position in case of a failure condition. The method includes preloading a stored energy element, detecting said failure condition, and driving said element to said failsafe position by unloading said stored energy element.

According to another aspect, a stabilizer bar system is provided including at least one stabilizer bar, a power source, and an actuator receiving electrical power from the power source. The actuator including a drive assembly configured to drive the at least one stabilizer bar. The drive assembly including a plunger having at least a first plunger position, the at least one stabilizer bar responsive to the plunger such that the at least one stabilizer bar is in a failsafe position when said plunger is in the first plunger position. The stabilizer bar system further including a stored energy element configured to drive the plunger to the first plunger position, and hence the at least one stabilizer bar to the failsafe position, upon detection of a failure condition.

According to yet another aspect, a failsafe actuator is provided for returning an actuator driven element to a failsafe position in case of a failure condition, the actuator including a drive assembly including an electric motor for driving a plunger via a gear train, and a stored energy element configured to drive the plunger from at least a second plunger position to a first plunger position upon the failure condition, wherein the actuator driven element is responsive to the plunger such that the actuator driven element is in the failsafe position when the plunger is in the first plunger position. The actuator further including a lost motion element associated with the plunger configured to allow the plunger to move between the first position and the at least second position when the driven element is blocked from moving. The actuator also including a direct indication sensor configured to sense the position of the driven element independently of the plunger; and a sensor configured to sense the relative position of the plunger.

According to still another aspect, a method is provided for controlling an actuator including measuring a time required to drive said actuator a predetermined initial portion of an actuator cycle at a predetermined driving power, and adjusting a driving power for a remainder of the actuator cycle in response to the measured time.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

The present invention relates generally to an actuator with a failsafe mechanism for permitting an actuator to move an actuator driven element to a more safe default position in case of a failure condition such as an external or internal electrical actuator failure. The present invention is described with reference to an actuator for activating and deactivating a stabilizer bar system in a vehicle. Those skilled in the art, however, will recognize that an actuator consistent with the present invention may be utilized in a host of other environments. Thus, it is to be understood that the present invention is not limited to the illustrated exemplary embodiments described herein. Rather, the present invention may be incorporated in a wide variety of actuators, and actuator systems and devices without departing from the spirit and scope of the present invention.

Figure 1:
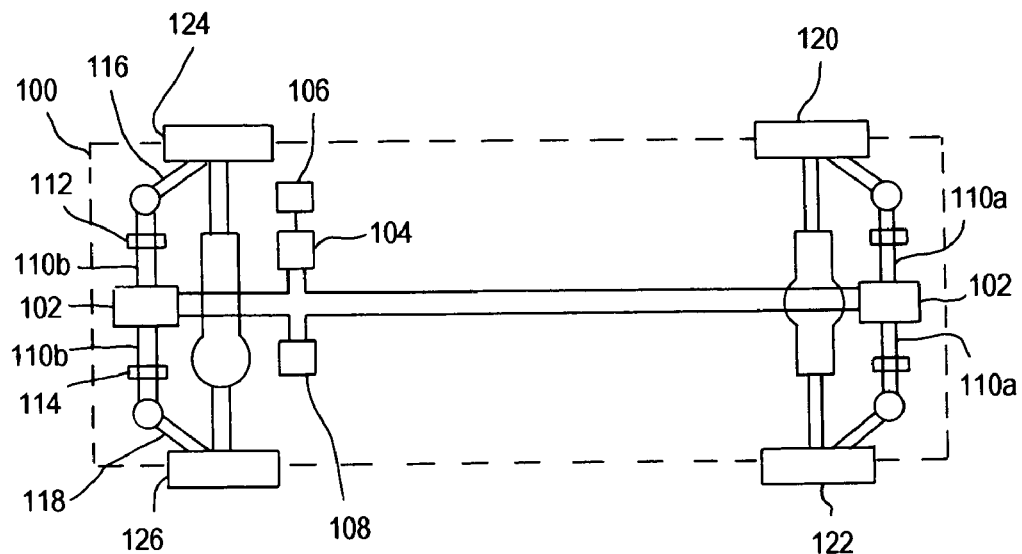
FIG. 1 is a simplified plan view of a vehicle having an exemplary actuator consistent with the present invention for driving a stabilizer bar of the vehicle.

Turning to FIG. 1, a simplified plan view of an exemplary vehicle 100 having actuator activated stabilizer bars 110a, 110b is illustrated. The stabilizer bars 110a, 110b may be coupled to either the front wheels 120, 122 or rear wheels 124, 126 respectively through a pair of suspension links 116, 118. The stabilizer bars 110a, 110b may be further coupled to the body of the vehicle by a pair of brackets 112, 114. Those skilled in the art will recognize a variety of means for coupling the stabilizer bars 110s, 110b to the wheels and to the vehicle 100.

An actuator 102 consistent with the present invention may be coupled to one or both stabilizer bars 110a, 110b at a mid-point between the front wheels 120, 122 or the rear wheels 124, 126 for driving the stabilizer bar system into an activated and deactivated position. However, those skilled in the art will recognize a variety of configurations for coupling an actuator to one or both stabilizer bars. For example, the actuator may be located closer to the wheels or at any point along the stabilizer bars 110a, 110b. The actuator may also not be coupled to the stabilizer bars 111a, 110b directly, but rather to some driving means to drive the stabilizer bars 110a, 110b.

A controller 104 may provide control signals to the actuator 102 to move the stabilizer bars 110a, 110b into either an activated or deactivated state. An activated state would typically be for most driving conditions on smooth road surfaces, while a deactivated state would be for rough road surfaces at low speed. The controller may be responsive to an operator input, an input from another one of the vehicle control modules, or a sensor 106 for sensing the current type of road condition. A variety of such sensors, and positions for locating such sensors within the vehicle, are known to those skilled in the art. For example, one such sensor may be adapted to transmit ultrasonic waves towards the road surface and to receive or detect the ultrasonic waves reflected back by the road surfaces. Judging the variation of the received signals over time and comparing them to a predetermined range enables the sensor to determine if the road surface is rough or smooth. Other sensors may use light or laser beams.

A power source 108 provides electric power to the actuator 102. The power source may be any number of power sources including a vehicle battery or any part of the vehicle's electrical system driven by the alternator when the vehicle's motor is running.

Figure 2:
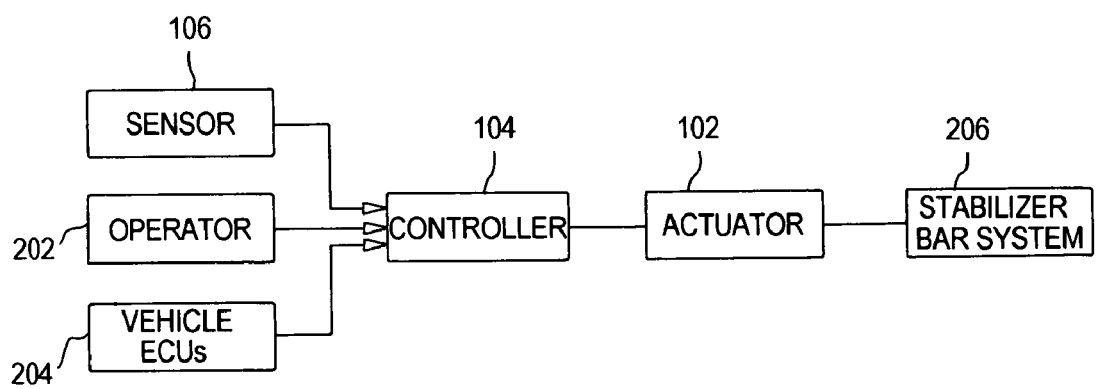
FIG. 2 is a simplified block diagram of an exemplary control system including an actuator consistent with the present invention for controlling the stabilizer bar system of FIG. 1.

In general, and with reference to the exemplary block diagram control system of FIG. 2, there are multiple ways to signal the stabilizer bar engagement system 206. One way is with a sensor 106. The sensor 106 senses when the vehicle is on a smooth or rough road surface and sends associated signals to the controller 104. Another way to signal the system is by operator command 202. The operator may elect to send a signal to the controller 104 through a switch. Yet another way to signal the controller is through any variety of the other vehicle control systems 204.

Once the controller 104 receives a signal from one of the various sources 106, 202, it may then confirm that all conditions are appropriate through communication with other vehicle systems. The controller 104 then, in turn, provides signals to the actuator 102 to deactivate or activate the stabilizer bar system 206 as desired. For instance, if an operator desires an off-road state the actuator 102 would deactivate the stabilizer bar system 206, or if the operator-desired a normal operating mode the actuator 102 would activate the stabilizer bar system 206.

Advantageously, an actuator 102 consistent with the present invention includes a failsafe mechanism to ensure that the stabilizer bar system 206 is driven to its failsafe, or activated position, in case of a failure condition such as an interruption in power from the power source 108 or an internal electrical failure in the actuator 102.

Figure 3:
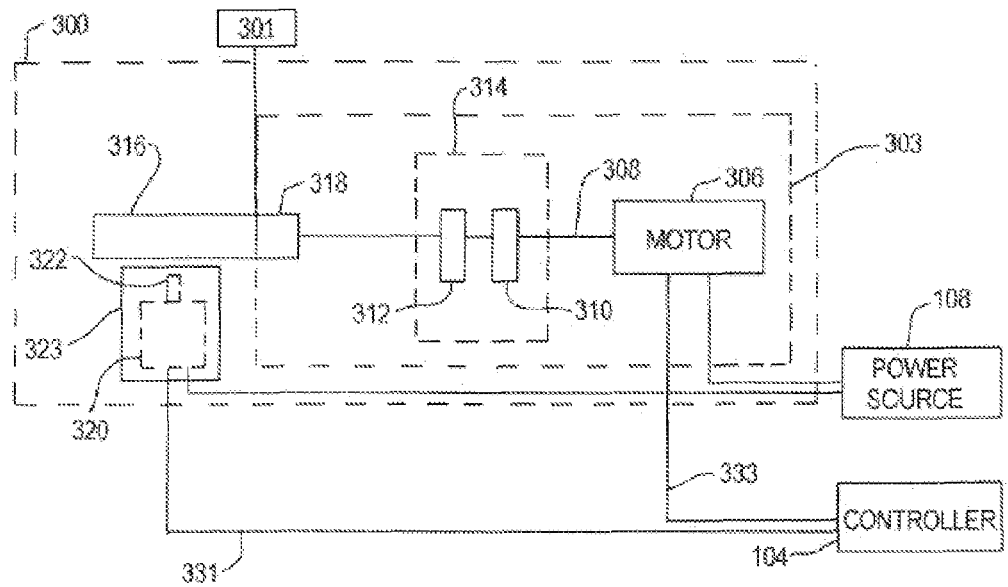
FIG. 3 is a simplified block diagram of an exemplary actuator consistent with the present invention having a mechanical failsafe system shown in a failsafe position.

Turning to FIG. 3, a simplified block diagram of an exemplary failsafe actuator 300 having a mechanical failsafe mechanism is illustrated. The actuator 300 is in a position that corresponds to a failsafe position for an actuator driven element 301. The actuator 300 includes a drive assembly 303 configured to drive an actuator driven element 301 such as a stabilizer bar or stabilizer bar system. The drive assembly 303 may include a motor 306 with an output shaft 308, a gear train 314, and a plunger 318.

The gear train 314 may include a set of reduction gears 310, e.g., a planet gear arrangement. The gear train 314 may also include a lost motion device 312, e.g., a clutch. The gear train 314 may be coupled to a plunger 318 to drive the plunger axially. The plunger may also be rotated or driven in other directions. The plunger may be driven against a return mechanism 316, e.g., a compression spring.

Figure 4:
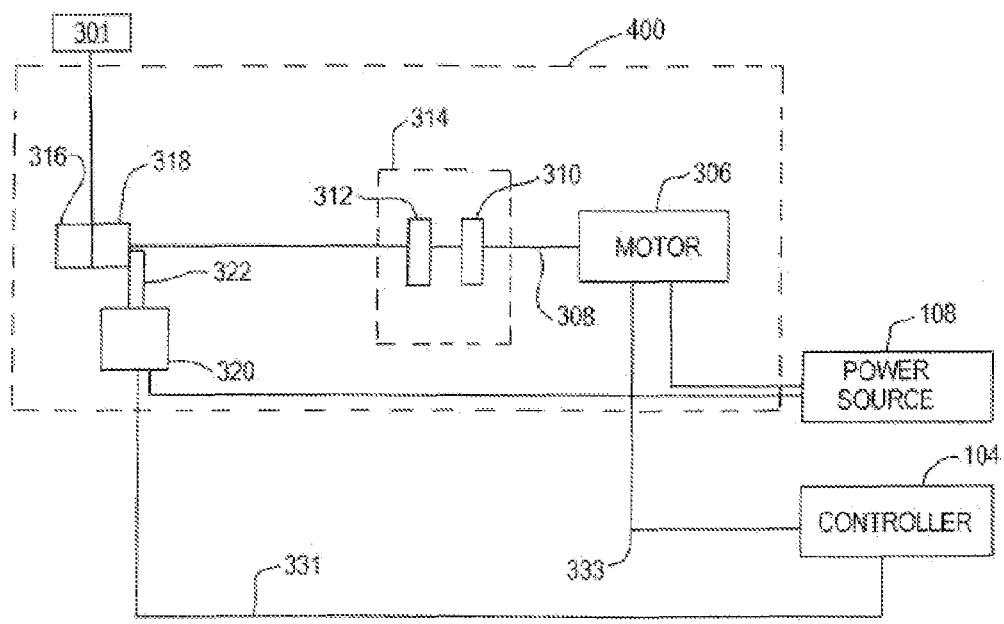
FIG. 4 is a simplified block diagram of the exemplary actuator of FIG. 3 in a non failsafe position.

As described more fully with reference to FIG. 4, an electromechanical mechanism 323 may also be provided to mechanically link to the actuator drive elements such that it can impede actuator output motion. For instance, one example of an electromechanical mechanism 323 is a solenoid 320 with a solenoid output shaft 322. The solenoid shaft 322 may be located perpendicular to the axially driven plunger 318. The solenoid 320 may also be controlled by a control signal through a separate control path 331 than the control path 333 for the motor 306.

Turning to FIG. 4, a simplified block diagram of the exemplary actuator of FIG. 3 in a non-failsafe position is illustrated. In a stabilizer bar system, the actuator position of FIG. 4 would result in a stabilizer bar disengaged position. For clarity, like parts from prior figures are represented by like numerals.

In operation, a signal (e.g., from sensor 106 or from operator input 202) is provided to the controller 104 to disengage the stabilizer bar system. The controller 104, in turn, provides a control signal to the motor 306 via control path 333. The output shaft 308 of the motor drives the plunger 318, through the gear train 314, axially away from the motor causing the return mechanism 316, e.g., a compression spring, to compress. The solenoid shaft 322 extends axially upward perpendicular to the axially extending plunger 318. The motor 306 may then be turned off while the plunger 318 and return mechanism 316 are held in a stabilizer bar disengaged position by the solenoid shaft 322.

The plunger 318 may be held until the controller 104 provides a proper control signal indicating smooth road conditions and triggering the plunger to return to its failsafe position of FIG. 3. In addition, a failure condition would also trigger return of the plunger 318 to the failsafe position of FIG. 3. For instance, the plunger may be held in its retracted position as long as a small holding current is applied to the solenoid 320 by the power source 108. In case of an external or internal electric failure causing interruption of the holding current, the solenoid output shaft 322 would self-retract to a retracted position. Such self-retraction force of the solenoid shaft 322 may be provided by an internal solenoid compression means, e.g., compression spring.

The return mechanism 316 biased against the plunger 318 may provide axial force in a direction back towards the motor. Advantageously, if necessary, the lost motion device 312, e.g., a clutch, may also be in its released position thereby aiding the return mechanism 316 to back drive the plunger against the gear train 314 with less force. As such, a failsafe mechanism is provided to back drive the plunger to its failsafe position of FIG. 3 in case of a failure condition such as an external or internal electric power failure.

In designing and choosing a return mechanism 316 and electromechanical mechanism 320, the retraction force of the electromechanical mechanism, e.g., the retraction force of the solenoid output shaft 322 should be greater than the frictional forces induced by return mechanism. The retraction-mechanism 316 should also provide enough force to back drive the plunger 318 against the gear train 314. Again, the use of the lost motion device, e.g., clutch 312, may enable this to occur with a modest retraction mechanism exhibiting less force. If there is no clutch, the retraction mechanism 316 should provide a greater force than if there is a clutch. The clutch is optional depending on the particulars of the system including the desired retraction mechanism and its associated retraction force.

Figure 5:
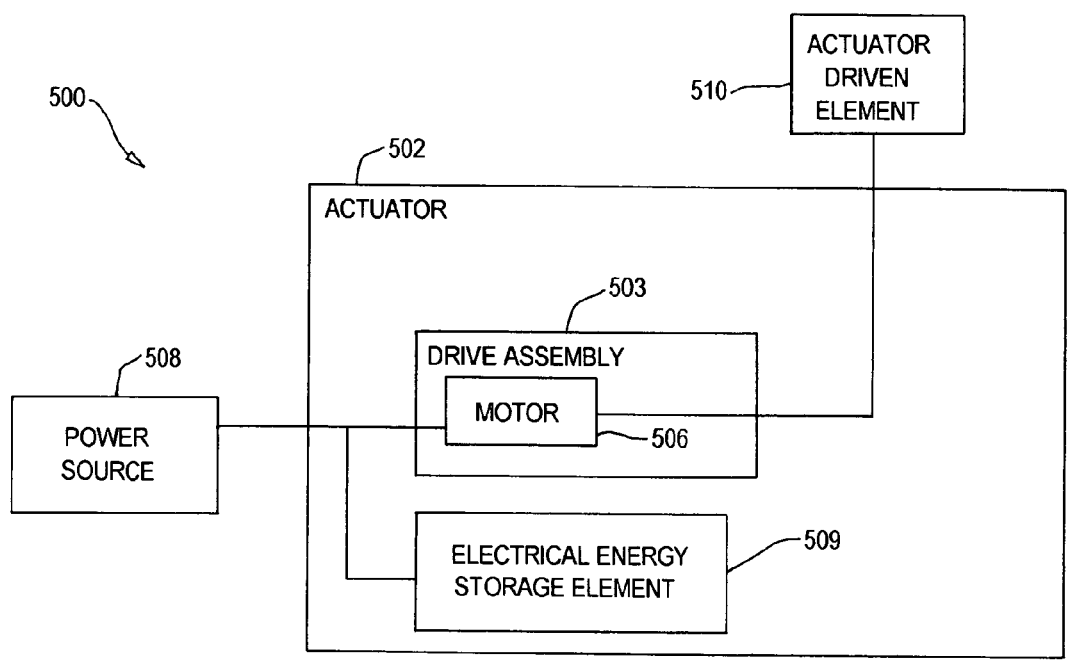
FIG. 5 is a simplified block diagram of another exemplary actuator consistent with the invention having an electrical failsafe system including an electrical energy storage element.

Turning to FIG. 5, a simplified block diagram system 500 of another exemplary actuator 502 consistent with the invention having an electrical failsafe system including an electrical energy storage element 509 is illustrated. In operation, the power source 508 normally provides power to the electrical motor 506 of the drive assembly 503. The drive assembly 503 in turn drives the actuator driven element 510. When the power source 508 is normally available, it serves to also charge the electrical energy storage element 509. Such element 509 may be any variety of devices known in the art for storing electric energy, e.g., a rechargeable battery, a capacitor, an inductor, and the like. Such element should be sized appropriately to provide sufficient electrical energy to the motor 506 such that the actuator driven element 510 may be driven to a failsafe position upon detection of a failure condition. For instance, such a failure condition may be loss of power from the power source 508 to the motor 506.

Figure 6:
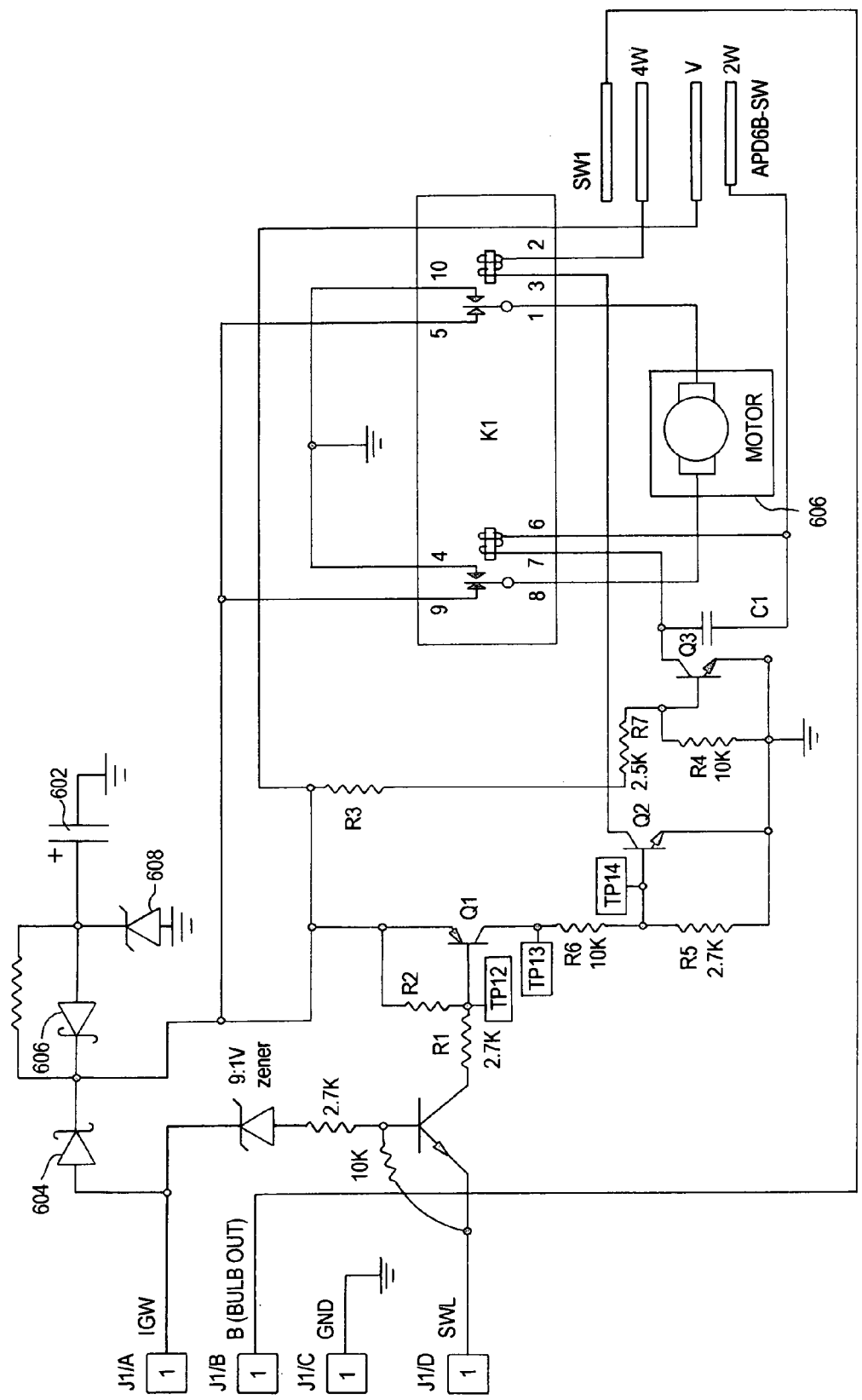
FIG. 6 is an exemplary circuit diagram of the actuator of FIG. 5.

Turning to FIG. 6, one exemplary circuit diagram for the actuator of FIG. 5 is illustrated. Those skilled in the art will recognize a variety of circuit configurations and electrical energy storage elements that may be used without departing from the scope of the present invention. The electrical energy storage element of FIG. 6 is a capacitor 602. The capacitor 602 should be large enough to provide sufficient electrical energy to the motor 606 to provide for a single actuation under worst-case conditions. For one exemplary capacitor 602, this would require a capacitor of 1 Farad at −40 degrees Celsius capable of being charged to 15 volts. A plurality of zener diodes 604, 606, 608 may also be provided to direct current flow to the capacitor 602 under normal charging conditions and from the capacitor under failsafe operation conditions.

According to another aspect of the invention, there is provided a failsafe actuator that senses the position of an actuator drive train and/or senses the position of a driven element that the actuator should be moving. Consistent with yet another aspect of the present invention, the driven element may or may not be in direct contact with the actuator plunger. The failsafe actuator may also provide lost motion in case the moved element is blocked from completing full travel. According to still another aspect, the failsafe actuator may develop a sensing strategy that can take maximum advantage of the actuator for reduced cost and maximum reliability. Finally, in another aspect the failsafe actuator provides a means of holding the plunger in a fully retracted configuration that, upon power loss, will allow the system to return to a fully extended configuration, i.e., a failsafe mode. For convenience, these various aspects are illustrated and described in one failsafe actuator. However, it should be understood that a failsafe actuator may include less than all of the above aspects.

Figure 7:
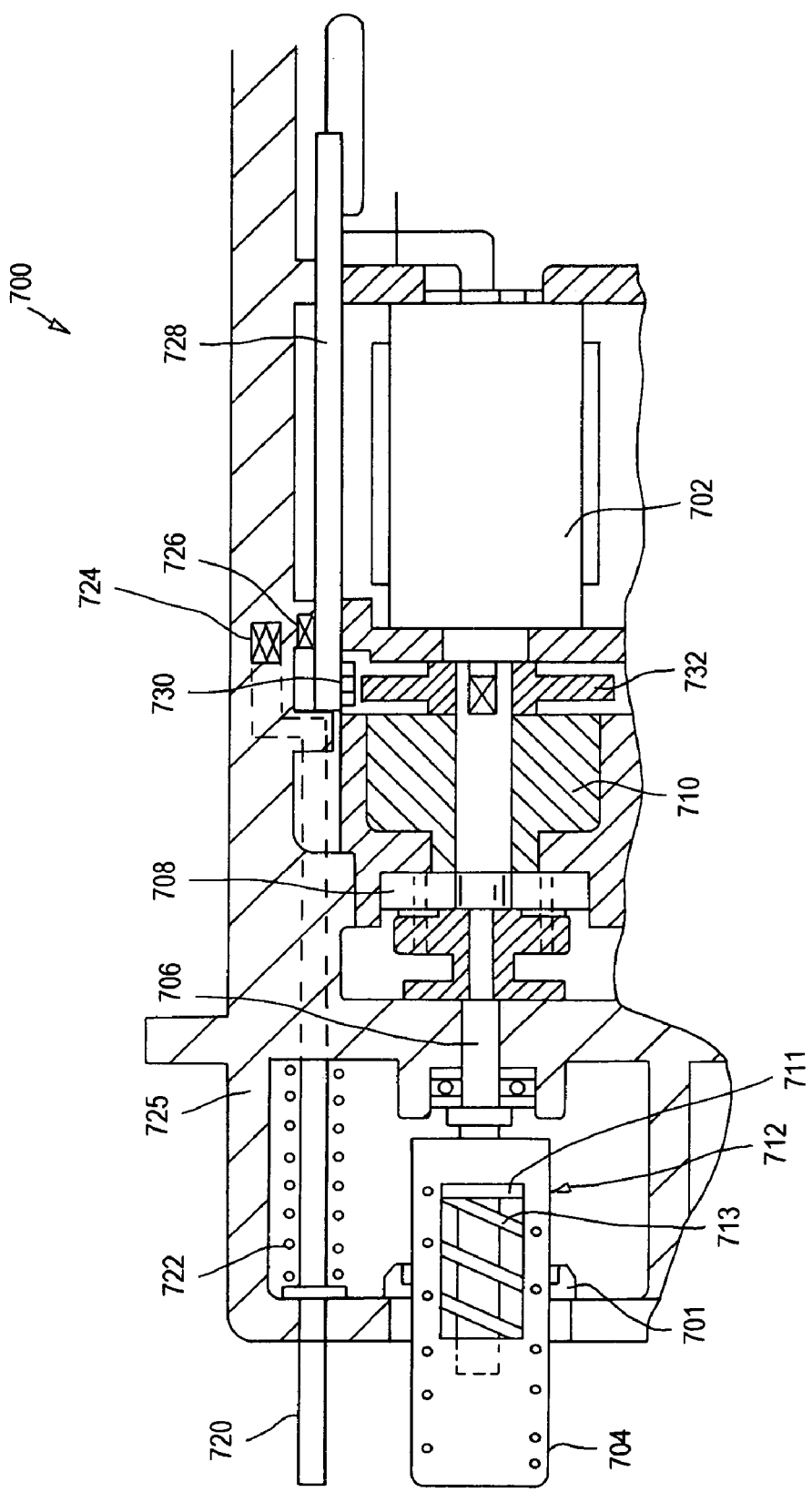
FIG. 7 is a sectional view of an exemplary actuator consistent with the present invention.

FIG. 7 is a partial cross-sectional view of an exemplary electromechanical actuator 700 consistent with the above aspect of the invention. As with previous embodiments, the actuator 700 generally includes a drive assembly configured to drive an actuator driven element such as a stabilizer bar system. The drive assembly may include an electric motor 702 that operates via a gear train 708 to drive a plunger 704 between at least a first plunger position and a second plunger position. The rotational motion of the motor 702 may be converted into axial movement of the plunger 704 using an Acme thread or worm drive 706. A variety of other mechanisms known to those having skill in the art may also suitably be used. The actuator driven element is responsive to the plunger 704 such that the actuator driven element is in a failsafe position when the plunger is in the first plunger position.

In addition to driving the plunger 704, the motor 702 loads a stored energy element 710. Consistent with the exemplary embodiment, the stored energy element may be a torsion spring or a spiral "clock spring". In the event of a failure condition, such as loss of electrical power to the drive assembly, the stored energy element 710 may provide a relatively constant rotational force sufficient to drive the plunger 704 from the second plunger position to the first plunger position, thereby moving the actuator driven element from a non-failsafe position to a failsafe position. The torsion or clock spring stored energy element 710 may be used to reduce the overall package size and drives the gear train 708 and motor at a point in the system that maximizes mechanical advantage, thereby improving reliability.

The stored energy element 710 may be engaged in a variety of ways. According to a first approach, the torsion or clock spring of the stored energy element may be compressed or preloaded when the plunger 704 is driven to the second plunger position, i.e., the non-failsafe position, by the motor 702. The plunger 704 may be maintained in the second plunger position by providing an input from the motor 702 sufficient to maintain the stored energy element 710 in the preloaded condition, and to maintain the plunger 704 in the second plunger position. In the event of a power loss, i.e., failure condition, the motor 702 may not have sufficient driving force to maintain the plunger 704 in the second plunger position against the stored energy element 710. In response to this failure condition, the stored energy element 710 will drive the plunger 704 to the failsafe first plunger position.

According to another approach, the stored energy element 710 may be preloaded, e.g., by the motor 702 when the plunger 704 is driven to the second plunger position. The stored energy element 710 may then be locked against unloading and driving the plunger back to the first plunger position by an electromechanical mechanism that locks the stored energy element 710 in the loaded condition. An exemplary electromechanical mechanism may include a electromagnetic latch that is energized when the plunger 704 is to be maintained in the second plunger position. When energized, the electromagnetic latch may restrict a shaft driven by the stored energy element 710 against rotating and driving the plunger back to the first plunger position. In the event of a failure condition in the form of a power loss the electromagnetic latch may be released allowing the shaft of the stored energy element 710 to drive the plunger back to the first plunger position.

According to yet another approach, the stored energy element 710 may be preloaded when the plunger 704 is driven to the second plunger position, i.e., non-failsafe position. When the plunger 704 has reached the second plunger position an electromechanical mechanism (latch) may be used to maintain the plunger 704 in the second plunger position. The electromechanical mechanism (latch) may be a solenoid arranged in a similar manner to that shown in FIGS. 3 and 4. That is, the solenoid may be energized against a compression spring such that the solenoid blocks axial movement of the plunger from the second plunger position to the first plunger position. Consistent with this approach, the failure condition may be in the form of power loss to the solenoid. When power is lost and the solenoid is no longer energized, the compressed spring of the solenoid may retract the solenoid to unlock the plunger 704. With the plunger 704 unlocked the stored energy element may drive the plunger 704, e.g. via the gear train 708, to the failsafe first plunger position.

The preceding approaches to maintaining the preload on the stored energy element 710 and releasing the stored energy element 710 to drive the plunger 704 to the first plunger position are only a few of the many possible approaches suitable for use with the invention herein. Those having skill in the art will appreciate numerous additional and alternative approaches.

The gear train 708 may be a high efficiency gear train, such as a planetary gear train. Furthermore, the gear train may include a self aligning feature and be incorporated with, or on, the stored energy element 710.

According to one aspect, the actuator 700 may also include a lost motion element 712 that, when actuated, allows the actuator 700 to complete the cycle and move the plunger 704 between an engaged and a disengaged position in the presence of a blocked condition that would otherwise prevent the actuator movement. According to the illustrated exemplary embodiment, the lost motion element 712 may include a spring 713 in the plunger 704. When the plunger 704 is cycled in the presence of an obstruction, the plunger inner piston 711 moves forward and compresses the spring 713, while the obstructed plunger 704 remains stationary.

In addition to permitting the actuator 700 to cycle in when the plunger is blocked, the lost motion element 712 according to this aspect allows very fast dynamic response to a safety critical system, such as stability bar engagement. When the actuator 700 is cycled to extend the plunger 704, but movement of the plunger 704 is blocked, the spring 713 is compresses and the plunger 704 becomes "cocked". When the blockage is removed, the compressed spring 713 is able to expand and acts to move the plunger 704, and any associated systems therewith, to an extended position independently of the motor 702 and gear train 708. This configuration may thereby, provide a fast dynamic response. Without this feature, the dynamic response would be dependent on the system impedance (motor armature, gear train rotational inertial and system friction). It will be understood by those having skill in the art that numerous other mechanism may also be used to achieve the same function.

According to another aspect, an actuator may include a sensor that can detect the position of the driven element or an element moved by the driven element. The sensor may be configured to detect the position of the driven independently of plunger or motor position. The "direct indication" sensor may be either an analog or digital, and may be programmed to compensate for manufacturing/mechanical tolerances as well as extreme temperature or environmental conditions. According to one aspect, the signal from the sensor may be used in a control algorithm that indicates overall system engage/disengage state with high resolution/precision.

Referring again to FIG. 7, the actuator 700 is illustrated including one exemplary direct indication sensor configuration. The sensor may include a probe 720 that may contact, and move with, the actuator driven element. In the illustrated embodiment, the probe 12 is a longitudinal member having an associated spring 722 biasing the probe 720 to maintain a distal end of the probe 720 in contact with the driven element throughout at least a portion of the driven element's range of motion. A sensor magnet 724 is coupled to the probe 720 adjacent the proximal end thereof. The sensor magnet 724 interacts with a linear Hall Effect sensor 726. As the probe 720 moves, the sensor magnet 724 with also move relative to the linear Hall Effect sensor 726, thereby causing the Hall Effect sensor 726 to provide output indicative of the position of the driven element. Numerous alternative "direct indication" sensors and sensor configurations will be understood by those having skill in the art.

Consistent with the exemplary sensor, the linear Hall Effect sensor may be located in the actuator housing 725, away from the harsh and/or dirty environment of the driven element, thereby reducing the risk of damage to the sensor electronics. This configuration also serves to allow the PCB 728 and other electronics associated with the actuator 700 and/or the sensor to be commonly located. Additionally, because the exemplary sensor is a non-contact sensor the driven element may be sensed via a relatively low force sensor probe. The non-contact configuration of the exemplary sensor also helps to isolate the sensor and electronics from vibration and other mechanical input to the probe 720.

According to another aspect, a failsafe actuator may also include an analog or digital motor rotation sensor for sensing the relative position of the actuator output plunger based on drive input. The sensor may be either a contact or a non-contact sensor, as will be readily understood by those having skill in the art. The use of a motor rotation sensor, used in conjunction with other actuator sensors, may, for example, be used to indicate a circumstance such as the driven element becoming stuck during any portion of its travel. Additionally, while the low force "direct indication" sensor, described above, senses the true or absolute position of the driven element, the motor rotation sensor indicates sensor input. Furthermore, the motor rotation sensor may allow the motor to hold the major force of the output plunger in the desired position, for example through the use of a lost motion element consistent with the previous description. The output of this motor rotation sensor may be used to engage/disengage a latching mechanism or to turn on alternative mechanisms (motor Pulse Width Modulated) to hold the actuator in the disengage/retracted state.

Referring again to FIG. 7, in one exemplary embodiment the actuator 700 may include a non-contact motor rotation sensor, such as a Hall effect sensor 730, associated with the actuator drive train for sensing the relative position of the plunger. The sensor 730 may count pulses corresponding to rotational movement of a sensor disk 732, or any other element of the drive assembly, which may include any reasonable number of magnetic poles, depending on the particular magnet/Hall sensor combination and the desired level of resolution. The sensor system may include at least a second Hall effect sensor (not shown) allowing the system to not only sense the magnitude of movement, but also the direction, i.e., clockwise or counterclockwise. Those having skill in the art will appreciate numerous other sensor configurations that will suitable achieve the same result, and may even require fewer sensing elements. The motor rotation sensor may allow the relative position of the plunger 704 to be detected even when the plunger has become stuck and is no longer actually moving.

According to another aspect, a failsafe actuator is provided having a latching mechanism that, when activated, may hold the output plunger in either an extended or retracted position. For example, such a latching mechanism may include a solenoid that, when energized, acts against a spring force to extend into the path of the plunger thereby holding the plunger in either an extended or retracted position. Such a configuration is illustrated in connection with FIGS. 3 and 4.

Among various advantages, a latching mechanism according to this aspect of the invention may allow power to the actuator motor to be eliminated when the latch is engaged because the motor is not needed to maintain the plunger position. Furthermore, the latching mechanism may also reduce the amount of current used by the system while the device is disengaged. The latching mechanism can also be used in lieu of a Pulse Width Modulated motor strategy to hold the system in either extend/retract mode.

According to this aspect of the invention, the latching mechanism may include a solenoid that is spring biased to an "unlatched" configuration. When the power to the latching mechanism is disrupted, either planned or unplanned, the solenoid of the latching mechanism is no longer energized against the spring force. The spring force may drive the solenoid to an unlatched condition allowing the plunger and the actuator to return the system to the engaged state, for example, as described above with reference to the stored energy element 10. Those having skill in the art will appreciate similar mechanisms for returning the, system of the engaged state.

According to yet another aspect, the present invention is directed at a failsafe actuator that is configured to be driven by a Pulse Width Modulated (PWM) signal. This aspect, of the invention may be used in conjunction with a motor rotation sensor, such as described above, wherein the motor rotation sensor provides an output indicative of magnitude of rotation as well as direction of rotation. The PWM may eliminate the need to monitor and adjust for motor based on temperature, system voltage/power, mechanical part tolerances manufacturing assembly variations and similar effects at the load/moved element.

Figure 8:
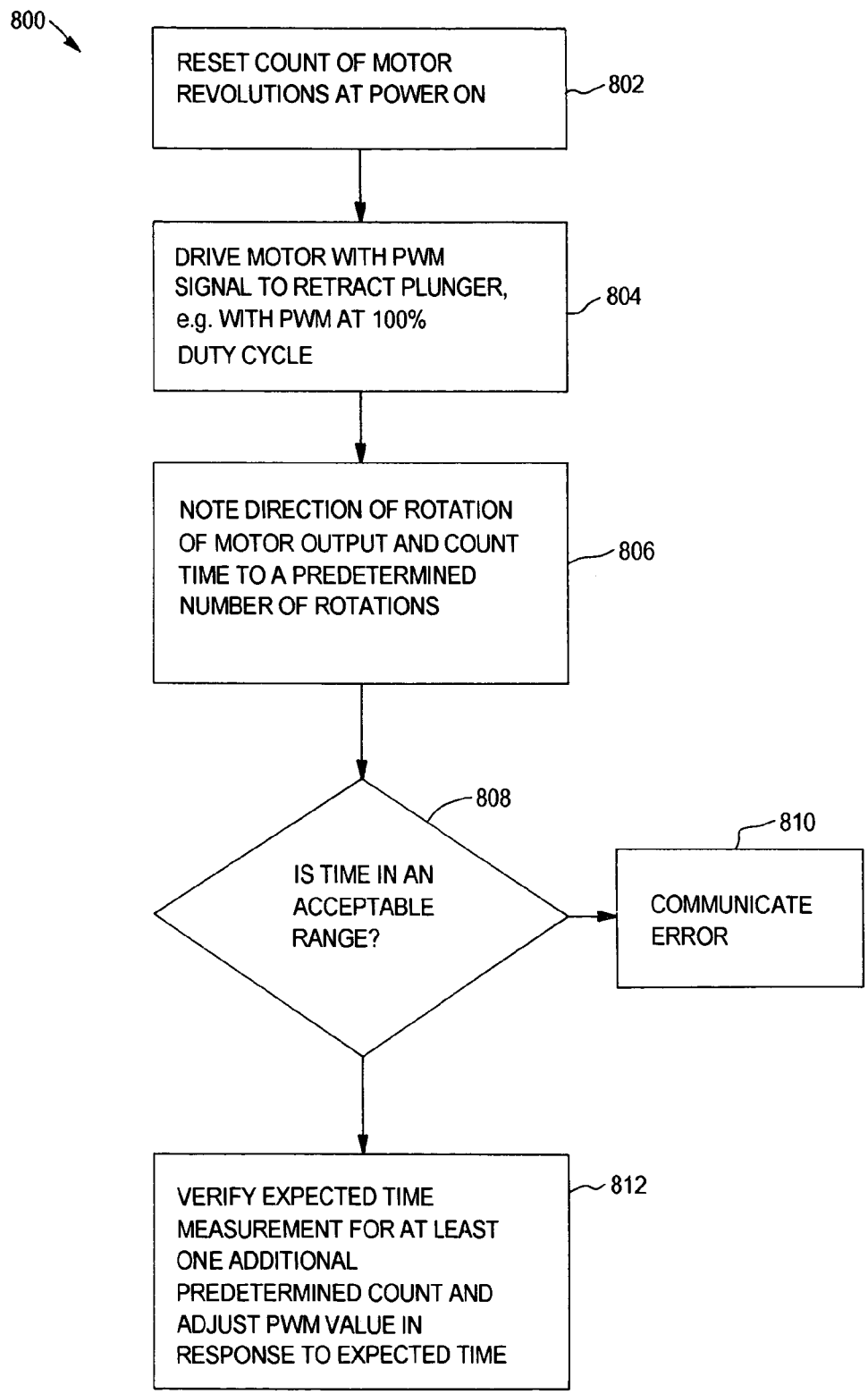
FIG. 8 is a block flow diagram of an exemplary method of controlling an actuator consistent with the present invention.

FIG. 8 is a block flow diagram of a method 800 consistent with one exemplary embodiment of the invention. The block flow diagram of FIG. 8 describes an exemplary embodiment including a particular sequences of steps. It can be appreciated however, that the sequence of steps merely provides an example of how the general functionality described herein can be implemented. Further, each sequence of steps does not have to be executed in the order presented unless otherwise indicated.

In the illustrated embodiment, the plunger may be initially held in the extend position by the energy storage element. When the power is applied to the motor, the motor revolution count may be reset 802. The motor may then be driven to retract the plunger, e.g. with a PWM signal at 100% duty cycle 804. The direction of rotation and the number of revolutions may be monitored and the time to achieve a predetermined number of revolutions may be measured 806. If the measured time is not within a predetermined range 808, an error mess age may be communicated 810. Otherwise, the time to at least one other predetermined count may be verified and the PWM value may be adjusted in response to an expected time measurement to maintain the motor in a retracted position at reduced power 812.

With reference again to FIG. 7, in one specific embodiment the motor power may be initially off and the actuator output plunger 704 may be held in the extending position by the stored energy element 710 and any mechanical stops 701 in the actuator housing 725. When the power to the motor 702 is turned on the motor rotation count is reset. A command for plunger retraction first turns the motor on at 100% duty cycle. For example, 34 motor rotations may be required to move the plunger from a fully extended position to a fully retracted position. As the motor is powered on, the direction of rotation is noted, for example, by the motor rotation sensor, and the time from a 0 rotation count to a 10 rotation count is measured.

Consistent with the exemplary algorithm, at least five possible outcomes are contemplated during the timed count from 0 rotations to 10 rotations. First, the system "times out" (i.e., a predetermined time is reached) before a 10 rotation count is achieved indicating motor failure or a mechanical jam. Second, a "longest time" option is measured (without the system timing out) suggesting at least one, or a combination of the lowest system power being provided to the motor, the highest acceptable mechanical loading (e.g., from lack of grease or mechanical binding) placed on the system, and/or the highest temperature extreme experienced by the system. In the third possibility, a "nominal time" is measured for achieving a 10 rotation count suggesting nominal operating conditions. In a fourth possible outcome, a "short time" option is measured suggesting one or a combination of the highest system power provided to the motor, the lowest (non-failure) mechanical loading on the system, and/or the lowest temperature extreme experienced by the system. Finally, in a fifth outcome a less than "short time" option is measured indicating failures such as a failed spring, failed connection between the motor magnet assembly and the spring, etc.

Based on the above-five result of the timed count from 0 rotations to 10 rotations, five corresponding actions may be taken. First, in the event of a "time out" an error message maybe developed. In response to the error message a remedial action, such as reversing the motor, may be taken. If the "longest time" is measured at count 32 the expected time measurement may be verified and the PWM may be set to High Value. When a "nominal time" is measured for the 0 to 10 rotation count, at the 30 rotation count the expected time measurement is verified and the PWM may be se to Nominal Value. According to a fourth possibility, i.e., a "short time" result, at count 27 the expected time measurement may be verified and the PWM se to Low Value. Finally, if less than "short time" is measured during the 0 to 10 rotation count, an error message may be developed that may either set the PWM to a Low Value and hold the actuator at 34 rotation count, or may reverse the PWM to return the motor to the "safe" poison, after which the motor may be powered off in the extended position.

Once the motor has achieved a measured 34 rotation count, the motor direction and count may be monitored in order to adjust and maintain the position the plunger in the desired position, i.e., in a retracted position. Alternatively, when the 34 rotation count is measured control signal may be generated to engage a locking mechanism, such as the solenoid locking system previously described. If a locking system is utilized the motor may be powered off. Even if the motor has been powered off, the motor direct and count may still be monitored to provide system information.

Also, the control software may develop and communicate an error if the plunger is determined to be at the commanded position based on rotation count, but the direct indication sensor probe detects that the moved element has not been moved by the actuator.

It will be appreciated that the functionality described for the embodiments of the invention may be implemented in a motor controller using hardware, software, or a combination of hardware and software, and well-known signal processing techniques. If implemented in software, a processor and machine-readable medium is required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further the processor and machine-readable medium may be part of a larger system that may contain various combinations of machine-readable storage devices through various I/O controllers, which are accessible by the processor and which are capable of storing a combination of computer program instructions and data.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A failsafe actuator for returning an actuator driven element to a failsafe position in case of a failure condition, said failsafe actuator comprising:
   a drive assembly configured to drive a plunger from a first plunger position to a second plunger position;
   a stored energy element configured to drive said plunger from said second plunger position to said first plunger position upon said failure condition, said actuator driven element responsive to said plunger such that said actuator driven element is in said failsafe position when said plunger is in said first plunger position;
   a sensor configured to indicate a relative position of said plunger; and a latching mechanism configured to maintain said plunger in said second position, and wherein said latching mechanism is configured to be actuated in response to said indicated relative position of said plunger.

2. The failsafe actuator of claim 1, wherein said stored energy element comprises at least one of a torsion spring and a clock spring coupled to said drive assembly, wherein said stored energy element is in a preloaded condition when said plunger is in said second plunger position.

3. The failsafe actuator of claim 1 further comprising an electromechanical mechanism configured to maintain said stored energy element in a preloaded condition when said plunger is in said second plunger position, and is further configured to release said stored energy element upon said failure condition.

4. The failsafe actuator of claim 3, wherein said electromechanical mechanism is configured to lock a shaft of said stored energy element against rotation when said plunger is in said second plunger position.

5. The failsafe actuator of claim 3, wherein said electromechanical mechanism is configured to hold said plunger in at least said second plunger position against said stored energy element and further configured to release said plunger upon said failure condition.

6. The failsafe actuator of claim 1 wherein said failure condition occurs when power to said actuator is interrupted.

7. The failsafe actuator of claim 1, wherein said plunger comprises a lost motion element configured to allow said drive assembly to complete a drive cycle when said plunger is blocked against movement.

8. The failsafe actuator of claim 1, wherein said drive assembly comprises an electric motor and a gear train configured for driving said plunger.

9. The failsafe actuator of claim 8 wherein said gear train comprises a planetary gear train.

10. The failsafe actuator of claim 1, further comprising a direct indication sensor configured to sense the position of said driven element independently of said plunger.

11. The failsafe actuator of claim 10 wherein said sensor comprises a non-contact sensor.

12. The failsafe actuator of claim 11, wherein said direct indication sensor comprises a Hall effect sensor.

13. The failsafe actuator of claim 10, wherein said direct indication sensor comprises a probe extending from an actuator housing, said probe configured to follow movement of said driven element.

14. The failsafe actuator of claim 1, wherein said sensor measures rotational movement of said drive assembly.

15. The failsafe actuator of claim 14 wherein said sensor is a non-contact sensor.

16. The failsafe actuator of claim 15, wherein said sensor is a Hall effect sensor associated with a rotating element of said drive assembly.

17. The failsafe actuator of claim 14, wherein said sensor is further configured to differentiate clockwise and counter-clockwise rotational movement.

18. A stabilizer bar system comprising:
at least one stabilizer bar:
a power source;
an actuator receiving electrical power from said power source, said actuator comprising: a drive assembly configured to drive said at least one stabilizer bar, said drive assembly comprising a plunger having at least a first plunger position, said at least one stabilizer bar responsive to said plunger such that said at least one stabilizer bar is in a failsafe position when said plunger is in said first plunger position; and
a stored energy element configured to drive said plunger to said first plunger position, and hence said at least one stabilizer bar to said failsafe position, upon detection of a failure condition, wherein said drive assembly further comprises an electrically driven motor driving said plunger via a gear train.

19. The system of claim 18, wherein said stored energy element comprises at least one of a torsion spring and a clock spring.

20. The system of claim 18, wherein said stored energy element is disposed between said motor and said gear train, and wherein driving said plunger to said at least first plunger position preloads said stored energy element.

21. A failsafe actuator for returning an actuator driven element to a failsafe position in case of a failure condition, said failsafe actuator comprising:
a drive assembly comprising an electric motor for driving a plunger via a gear train, and a stored energy element configured to drive said plunger from at least a second plunger position to a first plunger position upon said failure condition, said actuator driven element responsive to said plunger such that said actuator driven element is in said failsafe position when said plunger is in said first plunger position;
a lost motion element associated with said plunger configured to allow said plunger to move between said first position and said at least second position when said driven element is blocked from moving;
a direct indication sensor configured to sense the position of said driven element independently of said plunger; and
a sensor configured to sense the relative position of said plunger.

22. The failsafe actuator according to claim 21, wherein driving said plunger from said first plunger position to said at least second plunger position preloads said stored energy element.

23. The failsafe actuator according to claim 22, wherein said stored energy element comprises at least one of a torsion spring and a clock spring.

* * * * *